United States Patent [19]
Truman et al.

[11] Patent Number: 5,235,866
[45] Date of Patent: Aug. 17, 1993

[54] ROTARY TEMPERATURE CONTROL DEVICE

[75] Inventors: Mark R. Truman, Washington; Pravin R. Shah, Northville; Bipin D. Parekh, Plymouth; Kristen K. Hedstrom, Romeo, all of Mich.

[73] Assignees: Handy and Harman Automotive Group, Inc., Auburn Hills; Ford Motor Company, Dearborn, both of Mich.

[21] Appl. No.: 926,110

[22] Filed: Aug. 5, 1992

[51] Int. Cl.⁵ ................ F16H 19/00; F25B 29/00
[52] U.S. Cl. ................ 74/89.22; 74/501.5 R; 165/16; 165/42; 237/12.3 A; 242/54 R; 236/51
[58] Field of Search ............ 74/89.2, 89.22, 500.5, 74/501.5 R, 505, 506; 165/16, 42; 237/12.3 A; 242/54 R; 254/364, 365; 236/51

[56] References Cited

U.S. PATENT DOCUMENTS

| | | | |
|---|---|---|---|
| 1,300,471 | 4/1919 | O'Connor | 74/510 |
| 3,403,578 | 10/1968 | Morse | 74/500.5 |
| 4,041,797 | 8/1977 | Mito | 74/500.5 |
| 4,681,198 | 7/1987 | Costa Mas | 192/35 |
| 4,727,766 | 3/1988 | Cummings | 74/491 |
| 4,813,304 | 3/1989 | Kobayashi | 74/501.5 R |
| 4,840,080 | 6/1989 | Kobayashi | 74/501.5 R |
| 4,907,465 | 3/1990 | Machida et al. | 74/89.2 |
| 5,025,711 | 6/1991 | Cassidy | 454/156 |

*Primary Examiner*—Allan D. Herrmann
*Assistant Examiner*—William O. Trousdell
*Attorney, Agent, or Firm*—Pennie & Edmonds

[57] ABSTRACT

A rotary temperature control device which includes a vent pulley, a control pulley having a bevel gear associated therewith, a flexible cable which extends from the control pulley to the vent pulley and a shaft having a pinion gear associated therewith for driving the bevel gear, thus providing rotational movement to the vent pulley. The cable preferably has first and second ends and an intermediate portion therebetween which defines first and second segments, wherein the first and second ends are secured to the vent pulley while the intermediate portion is secured to the control pulley.

24 Claims, 8 Drawing Sheets

ROTARY TEMPERATURE CONTROL DEVICE

FIELD OF THE INVENTION

The present invention relates to temperature control devices, and in particular to automotive heating, ventilation and air-conditioning (HVAC) temperature control devices.

BACKGROUND OF THE INVENTION

Traditional heater cable controls operate as a linkage between the control panel and the vent door. In such a device, the cable must be able to withstand tensile and compressive loads because the cable is being both pulled and pushed to operate the vent door. The compressive loads require that the cable be somewhat rigid which, in turn, limits the radius of the bends which the cable can undergo during installation procedures, as well as in the final cable positioning. A further disadvantage of these traditional temperature control devices is that they often require adjustments in the length of the cable after installation into the vehicle.

U.S Pat. No. 5,025,711 discloses an integrated temperature and mode selector for a vehicle ventilation system which can be operated by a single actuator. This device discloses a rotatable shaft coupled to two doors for simultaneous rotation with the shaft. The first door determines the temperature of the air flow, and the second door determines the mode of operation, i.e., a heating, cooling or defogger mode.

SUMMARY OF THE INVENTION

It is the object of the present invention to provide a rotary temperature control device for controlling the blend or vent door of an automobile which overcomes the problems associated with the traditional automobile temperature control device and to overcome such disadvantages with a device that is simple in construction and easy to manufacture.

It is a further object of the preset invention to provide a temperature control device that is highly wear-resistant and insensitive to routing conditions.

According to the present invention, there is provided a rotary temperature control device for attachment between a vent pulley which is mounted on a vent housing and a control pulley with a bevel gear attached thereto mounted within a control housing located a distance away from the vent housing. A flexible cable is provided between the vent pulley and the control pulley. A shaft having a beveled pinion gear is provided wherein the pinion gear is adapted and configured to operatively cooperate with and drive the bevel gear to transmit rotational motion from the control pulley to the vent pulley.

This cable has first and second ends and first and second segments with an intermediate portion therebetween. The first segment is routed from the vent pulley, where the first end of the cable is secured, to the control pulley, where the intermediate portion is secured. The second segment is routed from the intermediate portion of the cable to the vent pulley where the second end is secured. The attachment of the cable is such that the first segment of cable is in tension when the control pulley is rotated in a first direction and the second segment is in tension when the control pulley is rotated in a direction opposite to the first direction.

In another embodiment, the rotary temperature control device includes means for automatically eliminating slack in the flexible cable. To do this, a vent spring is secured to the vent pulley and the first and second ends of the cable are secured to the vent spring. Also, the rotary temperature control device may include incremental adjustment means for incrementally adjusting the rotational motion of the control pulley.

Advantageously, the rotary temperature control device includes means for preventing undesired movement by the blend door, said door being operatively associated with the vent pulley. This rotation prevention means enables the user to lock the control pulley at either extreme setting, i.e., maximum hot or maximum cold, thus substantially preventing air from leaking through a space otherwise formed between the blend door and its foam seal. In addition, a crisp "positive feel" is produced within the control knob at the maximum settings to which the system is capable of being adjusted.

In another embodiment, the rotary temperature control device is provided with means such as a journal bearing formed upon the control housing for stabilizing the gear engagement between the pinion gear of the drive assembly and a bevel gear located on the control pulley.

BRIEF DESCRIPTION OF THE DRAWINGS

The above and other advantages of the invention will become apparent from the following description taken in conjunction with the accompanying drawings wherein like references refer to like parts and wherein.

DETAILED DESCRIPTION OF THE INVENTION

Figure 1:
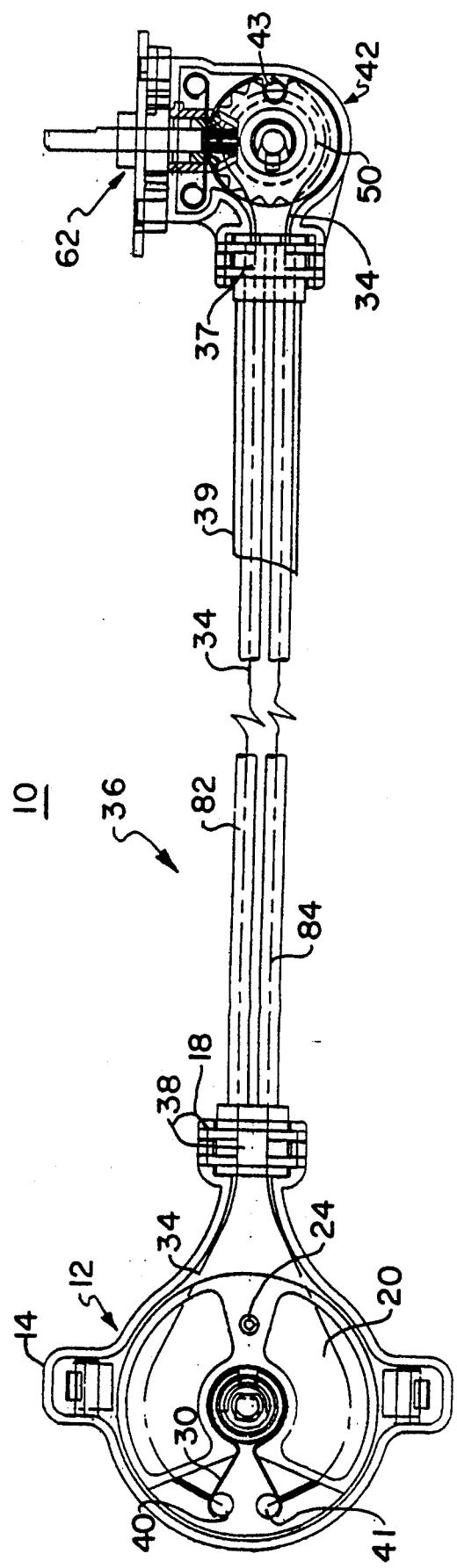
FIG. 1 is a plan view of the device according to the present invention.

FIG. 1 shows a rotary temperature control device (10) according to the present invention. The rotary temperature control device (10) includes a vent housing (12), a conduit (36), a control housing (42), and a drive assembly (62).

Figure 2:
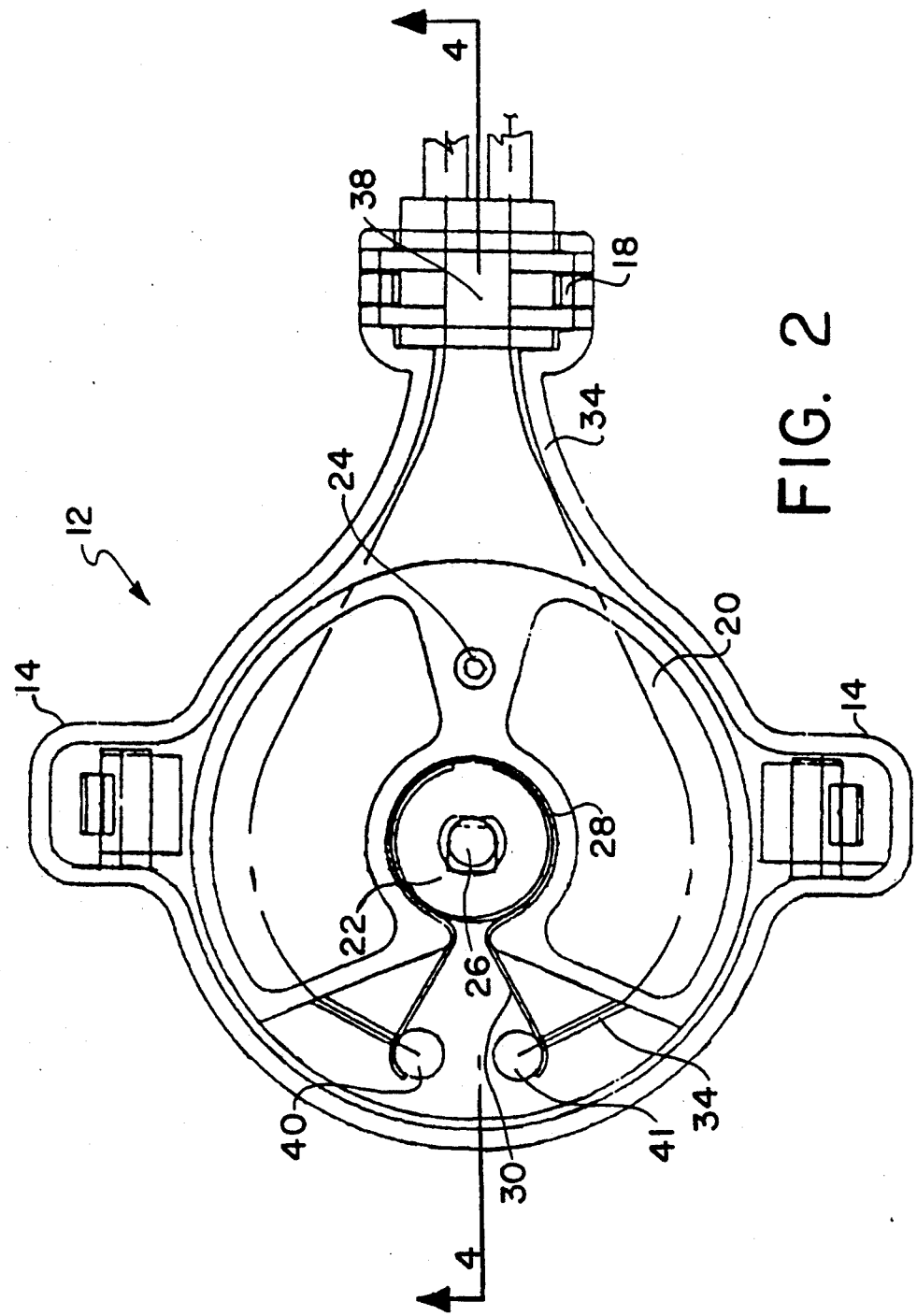
FIG. 2 is the vent-housing of FIG. 1.
Figure 4:
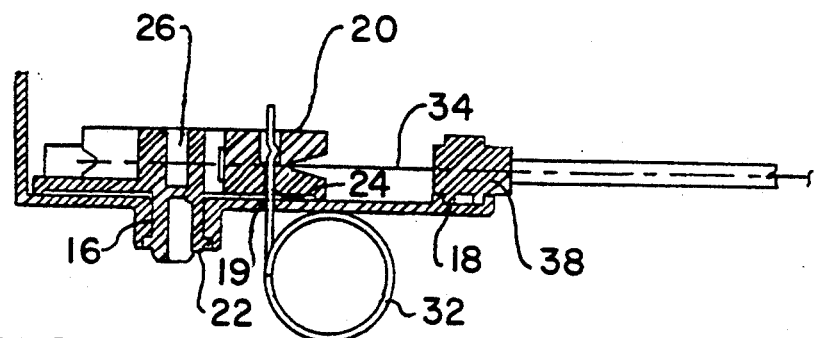
FIG. 4 is a sectional view of FIG. 2 taken along line 4—4.

Referring to FIGS. 2 and 4, the vent housing (12) has a vent pulley (20) to transfer motion to the blend door of the plenum of a vehicle. Although the blend door and vehicle plenum are not detailed here, the functions and features of these components are disclosed in U.S. Pat.

No. 5,025,011, the content of which is expressly incorporated herein by reference thereto.

The vent housing (12) has a central bore (16) for receiving a stem (22) which is formed on the vent pulley (20). The stem (22) of the vent pulley (20) is snap fitted within the central bore (16) which is formed in the vent housing (12), so that the vent pulley (20) can rotate within the vent housing (12). The vent pulley (20) has a "D"-shaped bore (26) formed in the stem (22) which receives the shaft of a vent door. Within the vent pulley (20), a slot (28) is formed for receiving a vent pulley spring (30). The vent pulley spring (30) provides a zero slack feature which takes up slack in a cable (34). The vent pulley spring (30) also removes any slack due to wear or cable routing variations.

Outwardly extending portions (14) are formed on the vent housing (10) to align and connect the vent housing (12) to the vehicle's plenum. The vent housing (12) also includes a conduit attachment guide (18) for receiving a double ferrule (38).

Figure 3:
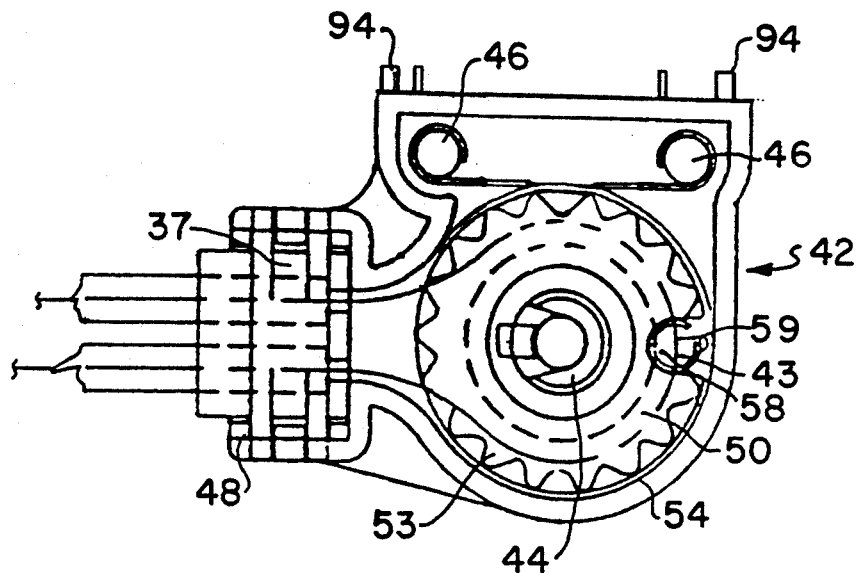
FIG. 3 is the control housing of FIG. 1.
Figure 5:
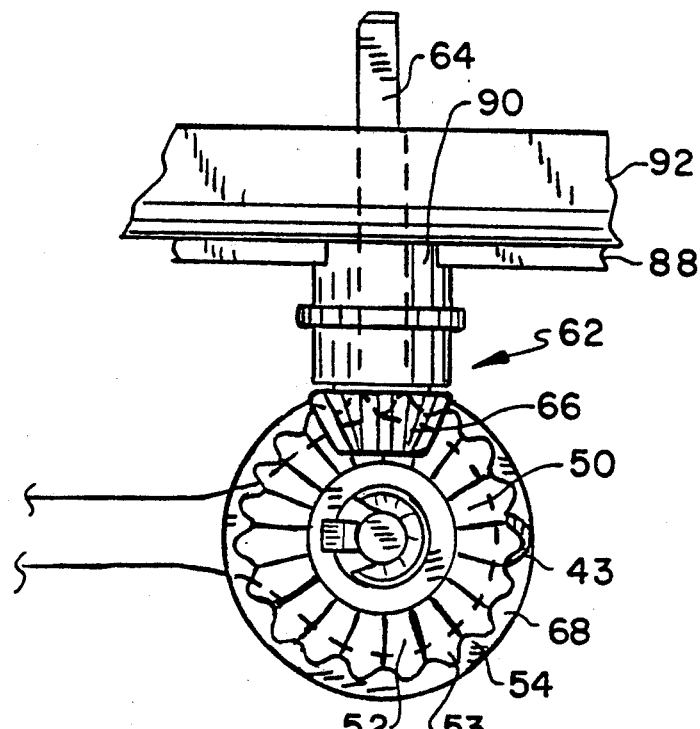
FIG. 5 is an elevation similar to FIG. 3.
Figure 6:
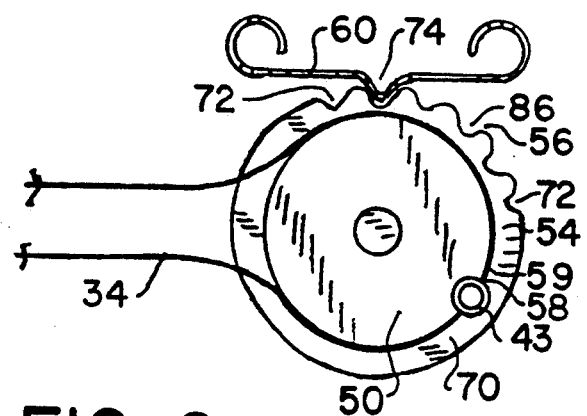
FIG. 6 is a sectional view taken along line 6—6 of the gear assembly of FIG. 9.

Referring now to FIGS. 3, 5 and 6, the control housing (42) is formed with a housing shaft (44) for mounting gear pulley assembly (50). The gear pulley assembly (50) is snap-fit and rotatable about housing shaft (44). Control housing (42) further includes a conduit attachment guide (48) for receiving a double ferrule (37). The double ferrules (38), (37) are designed to connect a conduit (36) to both the vent housing (12) and the control housing (42) by sliding within guides (18) and (48), respectively. The conduit (36) will be further described in detail hereinbelow.

The gear pulley assembly (50) includes a control pulley (54) having a gear (52) mounted on the upper surface (68) of the control pulley (54). Preferably the gear (52) has beveled teeth (53). The control pulley (54) and gear (52) are snap-fitted and rotatable in unison about housing shaft (44).

Located on the lower surface (70) of the control pulley (54) are detents (56). Preferably, the detents (56) are formed on only a segment of the lower surface (70) of the control pulley (54). Each end of the segment of detents (56) has reduced radius portions (72). Also located within the control housing (42) are posts (46) for retaining detent spring (60). Detent spring (60) has a middle ridge (74) for engaging the detents (56) in the lower surface (70) of the control pulley (54).

Detents (56) formed on control pulley (54) are formed so that the shaft (64) will rotate in predetermined increments. In operation, detent spring (60) has a middle ridge (74) which is biased to rest in the troughs (86) of the detents (56). In this manner, the arcuate measurement between troughs (86) determines the incremental setting. The reduced radius segment operates in a similar manner, with the middle ridge (74) of the detent spring (60) biased towards the lowest or most reduced radius location to thereby relieve any loading of the detent spring (60).

Figure 11:
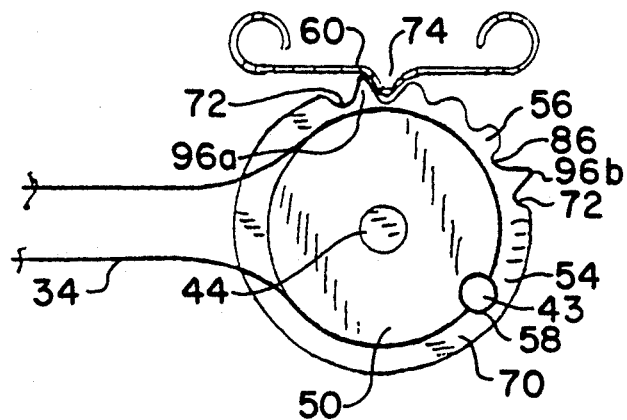
FIG. 11 is a view, similar to that in FIG. 6, of another embodiment of the invention.

Another embodiment of the gear pulley assembly (50) of FIG. 6 is illustrated in FIG. 11. The arrangement shown in FIG. 11, coupled with the features illustrated in FIGS. 12 and 13 (discussed below), is designed to prevent a condition known as "springback" which is commonly encountered among temperature control systems produced in accordance with the prior art. In such prior art systems, when the blend door is in the full hot or full cold position, it abuts against the adjacent opposing surface of the vehicle plenum, compressing a foam seal located thereupon. The foam has a tendency to spring back into its original uncompressed shape, thus causing the blend door to move and permitting leakage of air through the space thus created between the seal and the door.

This motion, coupled with hysteresis and the recovery of stored energy from loading the cable, thus causes the control knob to rotate back away from the extreme, i.e., maximum, setting. Moreover, the knob may exhibit a mushy feel in the subject areas which is undesirable. Therefore, one cannot achieve the maximum control settings, nor obtain the maximum performance from the system.

To prevent the occurrence of springback with the use of rotary temperature control device of the present invention, the outermost detents (96a, b) on control pulley (54) are sized larger, i.e., made higher, than the remaining detents (56) located inwardly therefrom. Thus, deflecting middle ridge (74) of detent spring (60) over either of the two larger detents (96a, b) on pulley (54) causes the control to be retained between the detent (96a or b) and the corresponding reduced radius portion (72) on pulley (54), which acts as a rigid stop, thus locking the assembly into position and entirely preventing the occurrence of springback at either maximum setting, i.e., maximum hot or maximum cold.

Figure 12:
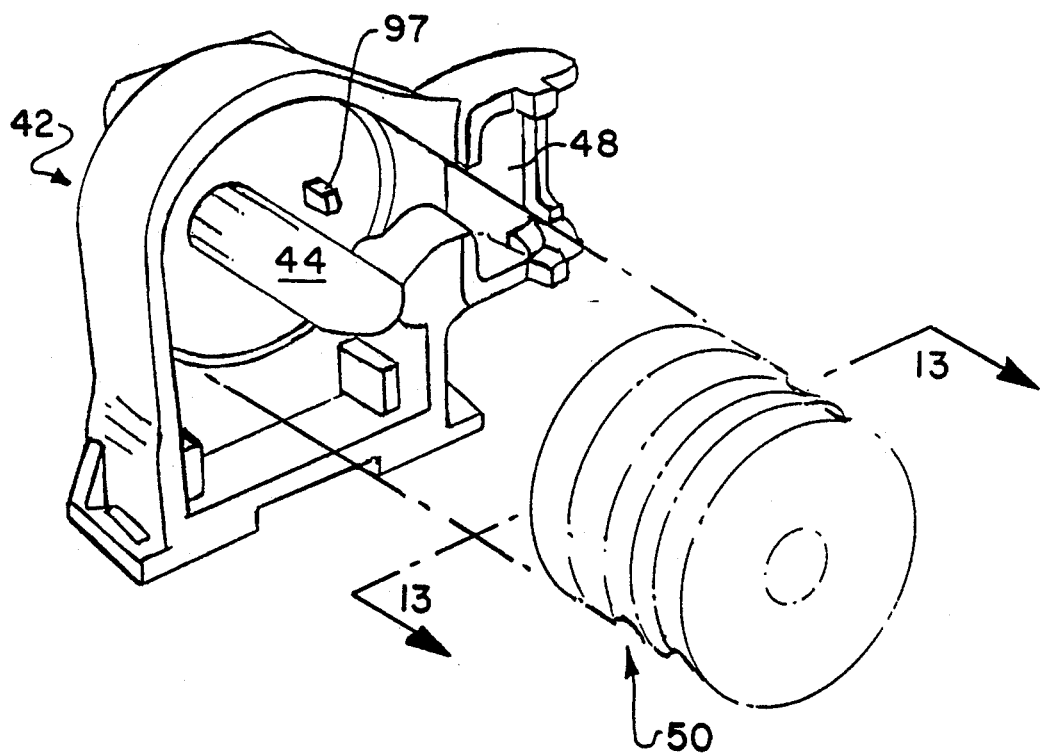
FIG. 12 is an exploded view illustrating another control housing and gear pulley assembly of the invention.
Figure 13:
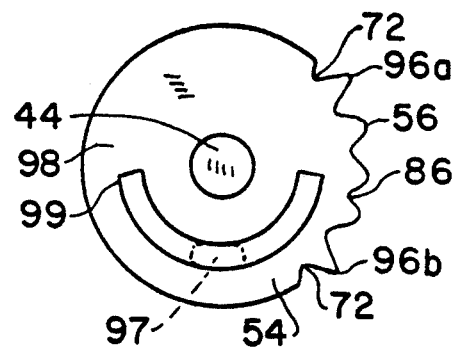
FIG. 13 is a sectional view taken along line 13—13 of the gear pulley assembly of FIG. 12.

In addition, as noted above, the embodiment of control pulley (54) illustrated in FIG. 11 may further be utilized in conjunction with the features of the invention shown and described with regard to FIGS. 12 and 13. FIG. 12 illustrates control housing (42) provided, upon its interior aspect, with stop rail (97). Stop rail (97) projects outwardly from housing (42) in a substantially perpendicular direction from the inner surface of housing (42), and is configured and adapted for engagement with a corresponding grooved portion (see FIG. 13) formed in the rear surface of gear pulley assembly (50) to limit the degree of rotation of which pully assembly (50) is capable, as described below with regard to FIG. 13. Stop rail (97) may be molded integrally with control housing 42 or, alternately, formed separately of an appropriate material, such as the same material used to form housing 42, and secured to the inner face of the housing at a location correspondingly related to the grooved portion in gear assembly (50).

Although stop rail (97) is shown as being substantially rectangular in shape and positioned adjacent housing shaft (44), neither the shape nor the position of stop rail (97) is critical as long as the structure is capable of fulfilling the intended function as described below.

Turning now to FIG. 13, there is illustrated the rear surface of gear pulley assembly (50) shown in FIG. 12. By "rear" surface is meant that surface positioned most closely adjacent the inner aspect of control housing (42) when gear pulley assembly (50) and housing (42) are snapped together such that pulley assembly (50) is engaged by housing shaft (44). As illustrated, for example, in FIG. 13, rear surface (98) of gear pulley assembly (50) is substantially flat and is provided with rotational track (99) cut into surface (98) at a radial distance from the center of pulley assembly (50). Track (99) is positioned and adapted to accept stop rail (97) which, as described above, projects substantially perpendicularly from the inner surface of control housing (42). The rotational limits of pulley assembly (50) are thus very precisely set by where the track ends.

Rail (97) and track (99) operate in conjunction with the detent arrangement illustrated in FIG. 11 such that, when pulley assembly (50) is rotated to its maximum clockwise position, such that stop rail (97), shown in phantom, contacts a first end of arcuate track (99), pulley assembly (50) is maintained in that position by locking engagement between ridge (74) of detent spring (60) and a corresponding one of the relatively larger detents (96a, b) on the outer periphery of pulley assembly (50). When pulley assembly (50) is rotated the maximum possible amount in the reverse, i.e., counterclockwise direction, stop rail (97) makes contact with the second closed end of track (99) in the rear surface of pulley assembly (50) while ridge (74) of detent spring (60) attains a locking engagement with the other one of the larger detents.

Referring to FIG. 1, conduit (36) consists of two polymer sleeves (82) and (84) for containing and protecting the cable (34). The conduit (36) enables the cable (34) to freely move without tangling, snagging or catching onto itself or any other components of the automobile. The conduit (36) is received in the double ferrules (37) and (38). Preferably, a sheath (39) contains the two sleeves (82) and (84) of the conduit (36) to prevent separation thereof.

Preferably, T-slugs (40) and (41) are mounted on the ends of the cable (34). A T-slug (43) is also mounted on about an intermediate point (59) of the cable (34). The T-slugs (40) and (41) mounted on the ends of the cable (34) are slid around the vent pulley spring (30) to secure the cable (34) within the vent pulley (20). T-slug (43) is mounted within slot (58) formed in the control pulley (54) to secure the cable within and to the control pulley (54).

The cable (34) is routed to form substantially a loop from the vent pulley to the control pulley and back to the vent pulley. In particular, the cable extends from the vent pulley spring (30) where T-slug (40) is secured, around and within a portion of the vent pulley (20), through double ferrule (38), within the sleeve (82), through double ferrule (37) and around and within control pulley (54) to slot (58) where T-slug (43) is mounted. From T-slug (43) the cable (34) continues extending, around and within the control pulley (54), through double ferrule (37), within the second sleeve (84), through the double ferrule (38) and around and within the vent pulley (20) where the T-slug (41) is secured to the vent pulley spring (30). In this manner, the cable (34) forms a loop from the vent pulley (20) to the control pulley (54) back to the vent pulley (20).

In an alternative embodiment, the cable can consist of two separate cables, each cable having a T-slug, such as (40) and (41), secured to each end of the two cables. The first cable would be secured to vent pulley spring (30) and then be guided within and about a portion of the vent pulley (20), extended through sleeve (82) and guided within and about the control pulley (54), and thereafter be secured to the control pulley (54) by a T-slug positioned within a slot. The second cable would extend through a similar path but from a second slot formed in control pulley (54) and through second sleeve (84) of conduit (36).

Referring now to FIGS. 1, 5, 7, 8 and 9, drive assembly (62) includes a shaft (64) having a pinion gear (66) mounted thereon. The pinion gear (66) preferably has beveled teeth (67). The shaft (64) has a keyway (78) and a flexible member (76) mounted about the shaft (64) to engage the keyway (78) to maintain the drive assembly (62) in a predetermined position for installation purposes.

The vent housing (12), control housing (42), conduit (36) and cable (34), hereinafter referred to as the pulley assembly, may be assembled and shipped separate from drive assembly (62). In this manner, the drive assembly (62) can be installed separate from the pulley assembly.

Figure 7:
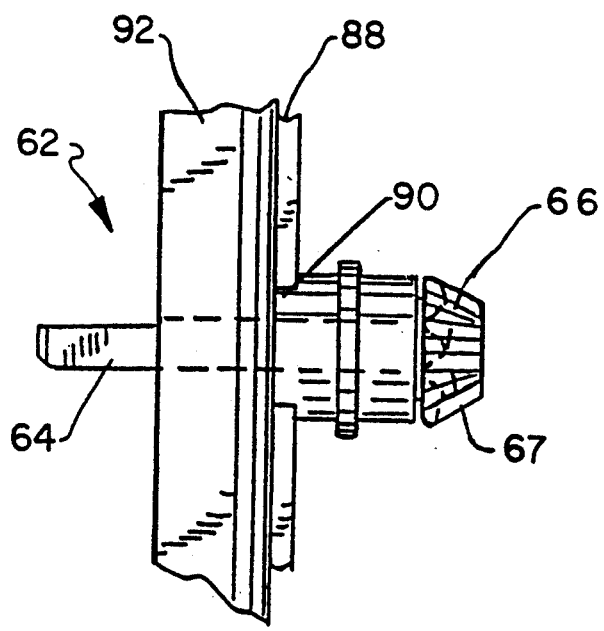
FIG. 7 is a side view of the drive assembly of FIG. 1.
Figure 8:
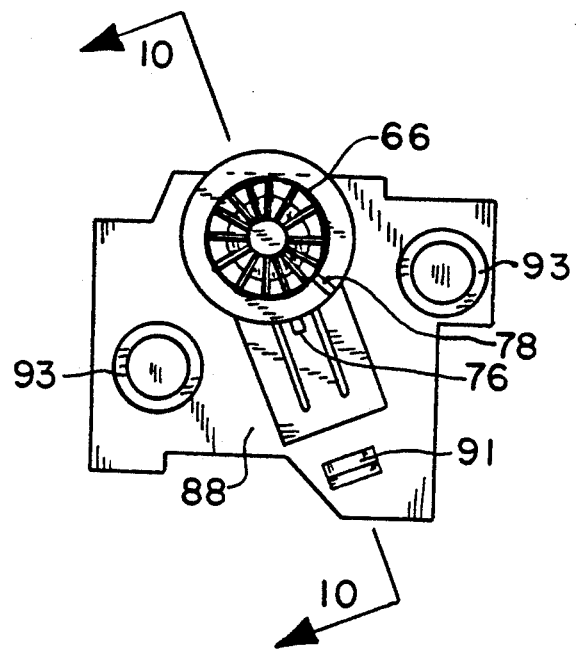
FIG. 8 is a front elevation view of the drive assembly with the control housing removed.
Figure 9:
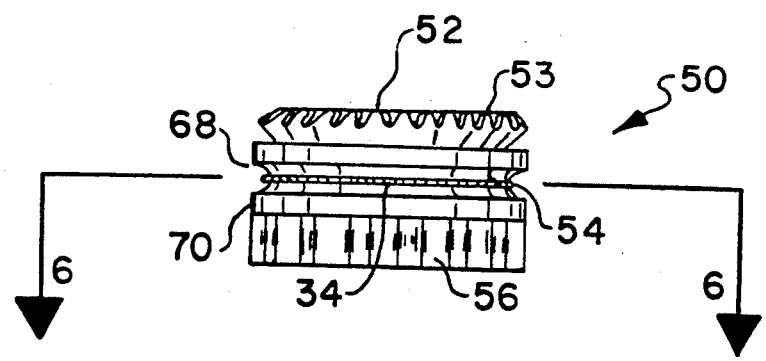
FIG. 9 is a rear elevation view of the gear pulley assembly of FIG. 5.

As illustrated in FIGS. 7 and 8, the rotary temperature control device (10) preferably includes a control base (88) having a center aperture (90) for receiving the drive assembly (62). The control base (88) also provides attachment clip (91) and alignment guides (93) to connect the rotary temperature device (10) to the control panel (92) of the automobile. In particular, as illustrated in FIG. 3, the control housing includes guides (94) which fit within alignment guides (93) and a lip (95) (FIG. 10) which is engaged by clip (91) for connecting and aligning the control housing (42) to the control base (88). Advantageously, the flexible member (76) which engages the keyway (78) is a part of the control base (88).

Preferably located within the vent housing (12) is an aperture (19). Likewise, the vent pulley (20) may contain a bore (24) which upon rotation of the vent pulley (20) can be aligned with aperture (19) in the vent housing (12) for receiving a grenade pin (32). The grenade pin (32) is inserted within aperture (19) and bore (24) to prevent rotation of the vent pulley and hence the cable (34) and control pulley (54) during shipment.

The flexible member (76) and keyway (78) aligns the shaft (64) in a predetermined position while grenade pin (32) aligns and maintains the pulley assembly in a predetermined position, so that the pulley assembly may be separately installed without requiring adjustment of either the drive assembly (62) or the pulley assembly after installation of the rotary temperature control device (10) in the vehicle.

Moreover, in yet another embodiment of the invention, rear surface (98) of gear pulley assembly (50) can be provided with visible orientation lines (not shown) which serve to align control pulley (54) with corresponding lines (not shown) on the inner surface of control housing (42) to provide a visual check for the correct orientation of these parts. This facilitates separate installation of the pulley assembly during the installation of rotary temperature control device (10) within a motor vehicle without, as noted above, requiring a separate adjustment of either drive assembly (62) or pulley assembly (50).

Figure 10:
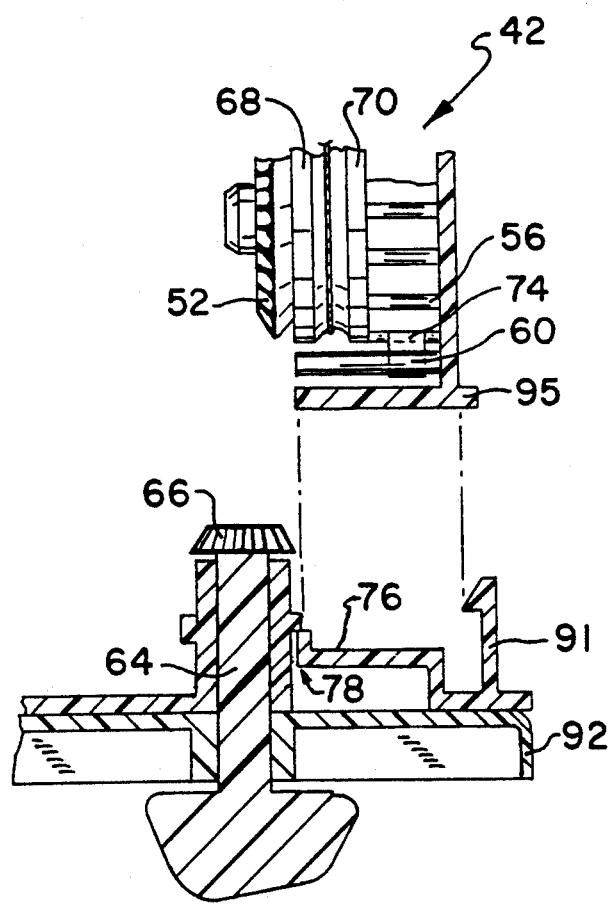
FIG. 10 is a sectional view of the engagement of the drive assembly with the control housing.

FIG. 10 illustrates the engagement of the control housing (42) with the drive assembly (62) including the preferred control base (88). Prior to engagement of control housing (42) with the drive assembly (62), the flexible member (76) is within the keyway (78) to maintain the drive shaft (64) at a predetermined location. The control housing (42) is installed by inserting control housing guides (94) within alignment guides (93) and pressing the control housing (42) toward the drive assembly (62) until clip (91) engages the lip (95) to secure the control housing (42) to the drive assembly (62). As the control housing is installed, the teeth (53) of gear (52) engages and meshes with the teeth (67) of pinion gear (66), while the control housing (42) engages and depresses the flexible member (76) so that flexible member (76) is no longer within the keyway (78). With the flexible member (76) no longer in the keyway (78), the shaft (64) and pinion gear (66), engaging gear (52), are free to rotate.

An advantageous embodiment of the means by which drive assembly (62) is engaged with control housing

Figure 14:
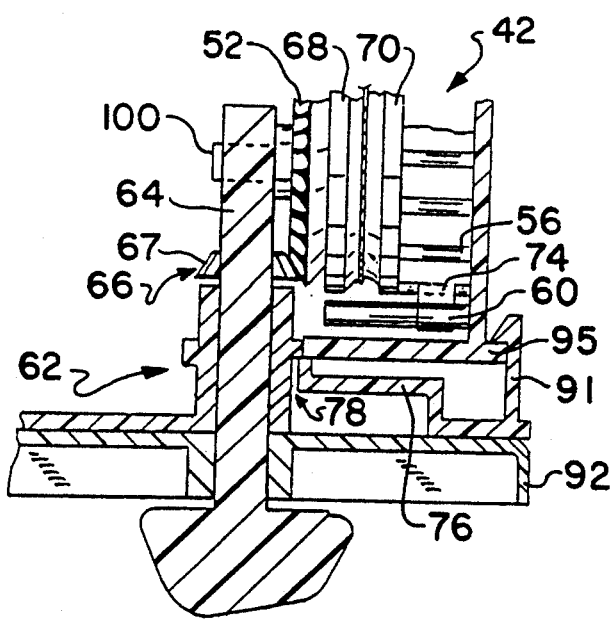
FIG. 14 is a view, similar to that of FIG. 10, of another embodiment of the invention.

(42) is illustrated in FIG. 14. As shown in FIG. 14, drive shaft (64) extends through beveled pinion gear (66) and is configured and adapted to engage a journal bearing (100) which is formed as part of control housing (42). This arrangement serves to stabilize the control housing and gear pulley assembly, locking them together to ensure full gear engagement between the two. When placed under a load, therefore, pinion gear (66) cannot "walk" or separate from gear 52, thus providing precision gear action.

The manner of operation of the rotary temperature control device (10) of the present invention will now be described. When shaft (64) is rotated, it rotates beveled pinion gear (66) which meshes with beveled gear (52) to transmit rotational motion to gear (52) about an axis of rotation which is perpendicular to the rotational axis of shaft (64). Beveled gear (52) is secured to control pulley (54) to thereby rotate control pulley (54) as well. T-slug (43) is secured to the control pulley (54) so that both the cable (34) and the control pulley (54) rotate about the housing shaft (44).

This configuration ensures that whenever the control pulley rotates, a segment of the cable (34) will be in tension. For example, if the control pulley (54) is rotated in the direction as shown in FIG. 1, the segment of cable (34) extending from T-slug (40) to T-slug (43) will be in tension, while if the control pulley (54) is rotated in the direction opposite to that shown in FIG. 1, the segment of cable (34) between T-slugs (41) and (43) will be in tension. Additionally, while the cable segment between T-slug (40) and (43) is in tension, any slack in the segment of the cable between T-slug (43) and (41) is removed by vent pulley spring (30). Likewise, any slack created in the segment of cable between T-slug (43) and (41) is taken up by vent pulley spring (30). Vent pulley spring (30) performs the additional function of removing any slack due to cable stretching, wear of any components of the rotary temperature control device, or cable routing variations.

The flexible member (76) and keyway (78) of the drive assembly (62) as well as the grenade pin (32) inserted within the aperture (19) and bore (24) are configured to correspond to a certain position of vent pulley (20) with shaft (64) to thereby fix the plenum or vent door at a certain position. This feature enables the drive assembly (62) to be transported separately from the rest of the apparatus.

The rotary temperature control device of the present invention may be manufactured as follows. The double ferrules (37) and (38) are assembled upon the conduit (36) and the cable is stranded through the sleeve (82) with a T-slug loosely fitted in the middle of the cable and the cable is then stranded through the second sleeve (84) of the conduit (36). T-slugs are crimped in place at both ends of the cable. The remaining loose T-slug is then crimped into a central position on the cable. The vent pulley spring (30) is mounted within the slot (28) of the vent pulley (20). Cable (34) is placed in, and in guiding alignment with the vent pulley (20), while the T-slugs (40) and (43) are slipped around the vent pulley spring (30) to secure the cable within the vent pulley (20). The vent pulley (20) can then be snap fit within the vent housing (12) while the double ferrule (38) is inserted within conduit attachment guide (18).

The gear pulley assembly (50) is fabricated by attaching the bevel gear (52) to the control pulley (54). The T-slug (43) is placed within the slot (58) in the control pulley (54) so that the cable (34) is secured to and guided within the control pulley (54).

The control housing (42) is assembled by placing the detent spring (60) over the posts (46) and thereafter snapping gear pulley assembly (50) into position over housing shaft (44) while double ferrule (37) is inserted within conduit attachment guide (48). When inserting gear pulley assembly (50) over housing shaft (44), the middle ridge (74) of detent spring (60) must be properly placed within the detents (56) to assure proper correlation between the control pulley (54) and the vent pulley (20). The bore (24) and aperture (19) are designed to align with each other to set the vent door at a predetermined position. This position must correspond with the detent spring (60) being properly spaced within a certain position along the segment of detents (56). Likewise, the flexible member (76) and keyway (78) must be designed to set the drive assembly (62) in a position which corresponds to the position which the vent pulley (20) is set by grenade pin (32) so that no adjustment is needed after the rotary temperature control device (10) is installed in the vehicle.

While the most preferred embodiment of the invention has been shown and described, it will be apparent to those skilled in the art that various changes and modifications may be made without departing from the true spirit and scope of the invention and the appended claims.

What is claimed is:

1. A rotary temperature control device comprising:
   (a) a vent pulley;
   (b) a control pulley having gear means associated therewith;
   (c) flexible cable means extending from the control pulley to the vent pulley for providing rotational movement to the vent pulley in response to rotational movement of the control pulley; and
   (d) a shaft having gear means associated therewith, wherein the shaft gear means is configured and adapted to operatively cooperate with the control pulley gear means for transmitting rotational motion from the control pulley to the vent pulley.

2. The device of claim 1 wherein the flexible cable means comprises a flexible cable having first and second ends and an intermediate portion therebetween for defining first and second segments, with the first segment extending from the vent pulley to the control pulley and the second segment extending from the control pulley to the vent pulley, wherein the first segment is in tension upon rotation of the control pulley in a first direction and the second segment is in tension upon rotation of the control pulley in a second direction.

3. The device of claim 1 wherein the flexible cable means comprises a first and second flexible cable each having a first end mounted to the vent pulley and a second end mounted to the control pulley, the first cable being in tension upon rotation of the control pulley in a first direction and the second pulley being in tension upon the rotation in a second direction.

4. A rotary temperature control device comprising:
   (a) a vent pulley;
   (b) a control pulley located a distance from the vent pulley;
   (c) a flexible cable extending from the vent pulley to the control pulley and back to the vent pulley; wherein the cable is adapted and configured to transmit rotational movement from the control pulley to the vent pulley through tension of a segment of the cable; and (d) means for rotating the control pulley.

5. The device of claim 4 wherein the means for rotating the control pulley comprises:
   (a) a shaft having a pinion gear mounted thereon for transmitting rotational movement to the control pulley.

6. The device of claim 5 wherein the control pulley includes a bevel gear adapted and configured to cooperate with the pinion gear for transmitting rotational motion to the control pulley.

7. The device of claim 6 wherein the cable has first and second ends and an intermediate portion therebetween for defining first and second segments, with the first and second ends secured to the vent pulley, and the intermediate portion secured to the control pulley, wherein the first segment is in tension upon rotational movement of the control pulley in a first direction and the second segment is in tension upon rotational movement of the control pulley in a second direction.

8. The device of claim 4 further comprising:
   (a) incremental adjustment means for incrementally adjusting the rotational motion of the control pulley.

9. The device of claim 8 wherein the incremental adjustment means comprises detents formed on the control pulley.

10. The device of claim 9 wherein the incremental adjustment means further comprises a detent spring adapted and configured to engage the detents to incrementally control rotational motion of the control pulley.

11. The device of claim 10 wherein the incremental adjustment means further comprises a segment of detents having a first and second end formed on the control pulley; wherein the control pulley has a reduced radius at the first and second end of the segment of detents to bias the detent spring away from the segment of detents.

12. The device of claim 11 wherein the outermost detent at said first and said second end of said segment is correspondingly larger than the remaining detents positioned inwardly therefrom whereupon, upon maximum rotation of said control pulley in either a clockwise or counterclockwise direction, said detent spring is deflected over a corresponding one of said outermost detents, thus locking said control pulley in position.

13. The device of claim 8 further comprising:
   (a) means for preventing overrotation by said control pulley.

14. The device of claim 13 wherein said means for preventing overrotation comprises:
   (a) a rotational track formed upon a rear surface of said control pulley; and
   (b) a stop member formed on a housing for said pulley, said stop member positioned and adapted to fit within said rotational track and to prevent overrotation of said control pulley in a clockwise or counterclockwise direction by contacting, respectively, a first and a second closed end of said track as said pulley is rotated more than predetermined distance in said clockwise or counterclockwise direction.

15. The device of claim 7 further comprising means for automatically eliminating slack in the flexible cable.

16. The device of claim 15 wherein the automatic slack eliminating means comprises:

(a) a vent spring secured to the vent pulley and having the first and second cable ends secured thereto.

17. A rotary temperature control device comprising:
   (a) a vent housing having a vent pulley mounted therein, a vent spring secured to the vent pulley and stationary means for maintaining the vent pulley in a predisposed position for shipping;
   (b) a control housing located a distance from the vent housing having a control pulley mounted therein, a beveled gear mounted in the control pulley and incremental adjustment means for incrementally adjusting the rotational movement of the control pulley;
   (c) a flexible cable extending between the control and vent housing having first and second ends and an intermediate portion therebetween for defining first and second segments; the first and second ends secured to the vent spring and the intermediate portion secured to the control pulley, the first segment being in tension upon rotational movement of the control pulley in a first direction and the second segment being in tension upon rotational movement of the control pulley in a second direction; and
   (d) a shaft having a beveled pinion gear mounted thereon, wherein the pinion gear is configured and adapted to operatively cooperate with the bevel gear for transmitting rotational motion to the control pulley; wherein the shaft includes alignment means for aligning the shaft in a predisposed position for attachment of the control housing.

18. The device of claim 17 wherein said shaft extends beyond said beveled pinion gear and engages a journal bearing formed upon said control housing so as to substantially lock said pinion gear and said bevel gear into full gear mesh engagement.

19. The device of claim 17 wherein the stationary means comprises an aperture formed in the vent housing, a bore formed in the vent pulley and a pin inserted within the aperture and bore.

20. The device of claim 17 wherein the alignment means comprises a keyway formed in the shaft and a flexible member mounted about the shaft and adapted to mate with the keyway to thereby align the shaft in a predetermined position.

21. The device of claim 17 wherein the incremental adjustment means comprises a segment of detents formed on the control pulley and a detent spring mounted with the control housing, the detent spring adapted and configured to engage the detents to incrementally control rotational motion of the control pulley.

22. The device of claim 21 wherein the outermost detent at said first and said second end of said segment is correspondingly larger than the remaining detents positioned inwardly therefrom whereupon, upon maximum rotation of said control pulley in either a clockwise or counterclockwise direction, said detent spring is deflected over a corresponding one of said outermost detents, thus locking said control pulley in position.

23. The device of claim 17 wherein the vent pulley has a stem and the vent housing has a mounting bore which receives the stem, the stem having a D-shaped bore for receiving a shaft of a plenum door.

24. The device of claim 23 further comprising a plenum door coupled and configured to rotate in response to the rotational movement of the vent pulley.

* * * * *